Patented Dec. 1, 1925.

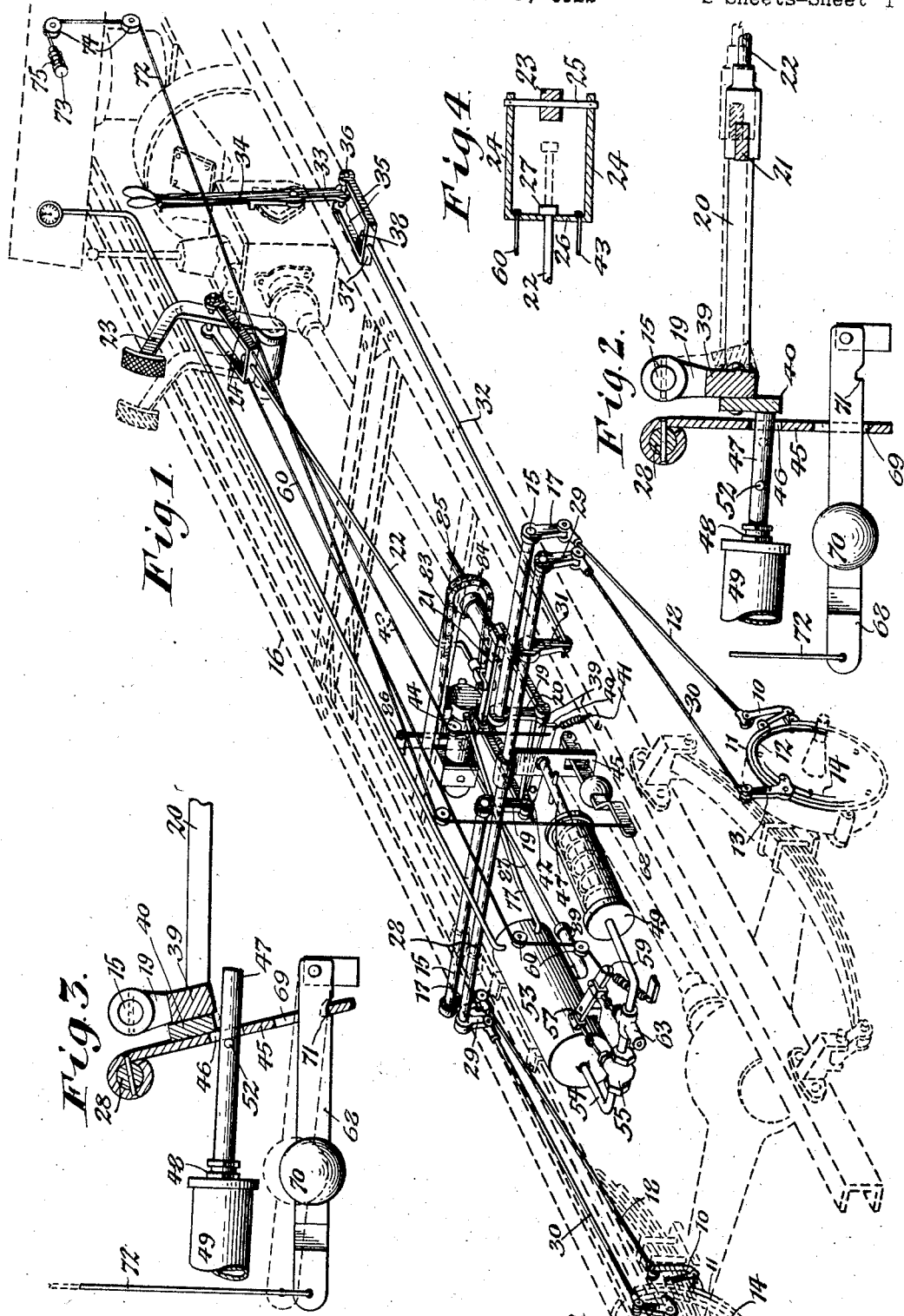

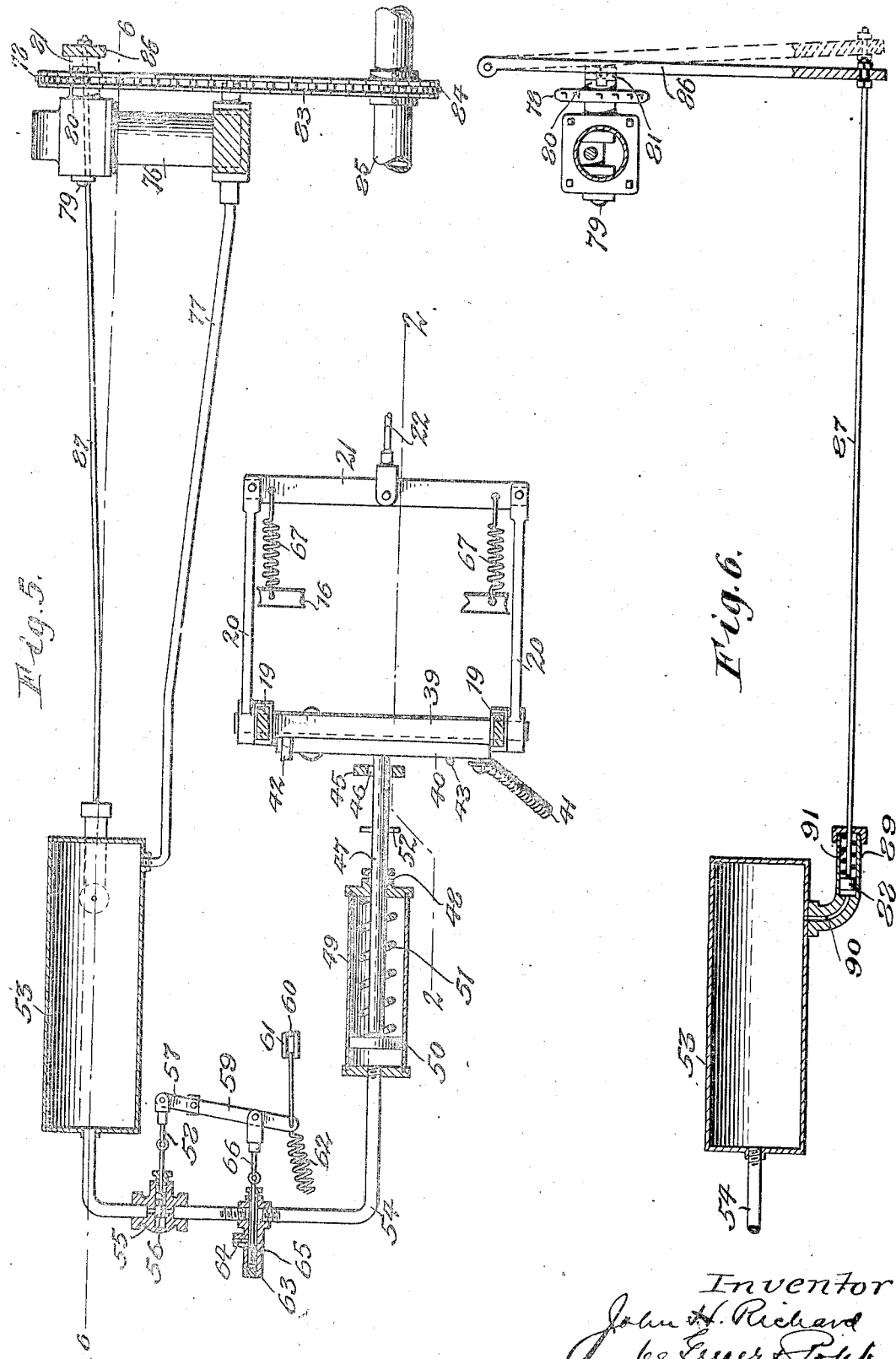

1,563,588

UNITED STATES PATENT OFFICE.

JOHN H. RICHARD, OF BUFFALO, NEW YORK, ASSIGNOR, BY DIRECT AND MESNE ASSIGNMENTS, TO RICHARDS AIRBRAKE CO. INC., OF BUFFALO, NEW YORK, A CORPORATION OF NEW YORK.

BRAKE MECHANISM FOR AUTOMOBILES.

Application filed December 16, 1922. Serial No. 607,412.

*To all whom it may concern:*

Be it known that I, JOHN H. RICHARD, a citizen of the United States, residing at Buffalo, in the county of Erie and State of New York, have invented new and useful Improvements in Brake Mechanism for Automobiles, of which the following is a specification.

This invention relates to a brake mechanism which is more particularly designed for use in automobiles in connection with the usual foot and hand operated-brakes, so as to enable both brake shoes or members on the inner and outer sides of the brake drums on the wheels or elsewhere to be operated by air pressure as well as manually, and thus permit of controlling the operation of an automobile with greater certainty, safety and ease.

It is the object of this invention to provide a brake mechanism of this character which can be combined with the standard organization of braking mechanism for automobiles as now commonly used and permit of operating the usual foot and hand brakes by means of an air operated motor and thus relieve the operator or driver of this work and also permitting the brake mechanism to be operated either by foot pressure or by hand pressure in the event that the air-operated motor should for some reason become defective.

In the accompanying drawings: Figure 1 is a fragmentary perspective view of an automobile equipped with my improved brake mechanism. Figure 2 is a fragmentary vertical longitudinal section of the same taken on line 2—2, Fig. 5, and showing the brake mechanism in its relaxed or released position. Figure 3 is a similar view showing the brake mechanism in the position which it occupies when both the foot and hand operated members are actuated by air pressure for setting the brakes. Figure 4 is a fragmentary horizontal section showing the manner of connecting the foot brake lever with the foot operated pull rod, the air motor controlling line and the line for permitting the air motor to operate the inside brake shoes or bands of the brake drums as well as the outside brake shoes or bands of the same. Figure 5 is a fragmentary horizontal section of the brake mechanism, showing the air operated motor for setting the brakes and the mechanism for supplying the same with air. Figure 6 is a fragmentary vertical longitudinal section taken on line 6—6, Fig. 5.

Similar characters of reference indicate corresponding parts throughout the several views.

Although my invention may be embodied in an automobile having a manually-operated brake mechanism which may be variously constructed so far as its details are concerned, the accompanying drawings show one embodiment of the same in connection with a standard type of brake gearing which is constructed as follows:

10, 10 represent two arms, rock levers or members operating to contract the usual outer brake bands or shoes 11 which surround the outer sides of the brake drums 12 which are mounted on parts which rotate with the rear or driving wheels of the automobile, and 13, 13 are two similar rock arms, levers or members serving to shift the internal brake shoes or members 14 which are adapted to engage with the inner sides of the aforesaid drums. The first-mentioned shifting members 10 form part of what is commonly known as the "foot brake mechanism" or normal brake which is operated by foot power, while the last-mentioned arms or members 13 form part of what is commonly known as the hand brake or emergency brake mechanism which is operated by hand power, but the two will be referred to hereafter as manually operated brake mechanisms.

15, 15 represent the two sections of the primary or foot brake mechanism rock shaft which are journaled in any suitable manner on the underside of the main frame 16 of the automobile, so that they are in line with each other and which are provided at their outer extremities with depending rock arms 17 which are connected by means of pull rods 18 with the outer brake shifting members 10, 10. The opposing inner ends of the foot brake rock shaft sections are provided with depending primary operating rock arms 19 the lower ends of which are connected respectively by means of longitudinal bars or links 20, 20, with a transverse equalizing bar or lever 21. The central part of the latter is connected with the rear end of a pull rod 22 and the front end of this rod is connected with the foot brake lever or pedal 23 above the point where the same is fulcrumed or pivoted on the main frame of the automobile. The connection between this pull rod 22 and the foot brake lever 23 is preferably so constructed that it is possible to move this pull rod forwardly independently of this foot brake lever and thus avoid interference with the latter when the brake mechanism is applied by means of air pressure. The preferred means for this purpose which are shown in Figs. 1 and 4 consists of a U-shaped coupling yoke or clevis, the longitudinal bars or arms 24, 24 of which are connected at their front ends with the foot brake lever or pedal by means of a tranverse pin 25 while the cross bar 26 on this yoke or clevis which connects the rear ends of these arms is provided centrally with an opening which receives the front part of the pull rod 22, the latter being provided at its front end with a head or enlargement 27 which is adapted to engage with the front side of the cross bar 26, as shown by full lines in Fig. 4. Upon moving the foot brake lever or pedal forwardly by means of foot pressure, the cross bar 26 of the coupling yoke by engaging with the head 27 at the front end of the pull rod, will serve to pull this rod 22 forwardly and to contract the external brake bands or shoes 11 of both brake drums in the usual manner. If, however, these brake shoes are applied by means other than the foot lever 23, the pull rod 22 is moved forwardly independently of this yoke, in which event this rod slides forwardly through the opening in the cross bar 26 without shifting the latter on the pedal 23 with which it is connected, this position of the front part of the pull rod and its head being indicated by dotted lines in Fig. 4. The backward movement of the foot brake mechanism is preferably effected by means of springs 67 connecting opposite ends of the equalizing bar with convenient parts of the main frame, as shown in Fig. 5.

Immediately in rear of the foot brake rock shaft sections is arranged a transverse emergency or secondary rock shaft 28 which is journaled horizontally in suitable bearings on the main frame and provided at its opposite ends with depending rock arms 29 which are connected by means of pull rods 30, 30 with the shifting members 13 associated with the internal brake shoes or bands 14 of the brake drums. This rear rock shaft 28 forms part of the hand or emergency brake system and is provided adjacent to one end thereof with a depending intermediate rock arm 31 which is connected with the rear end of an emergency pull rod 32. The front end of this last-mentioned rod is connected with the lower arm 33 of a hand operated emergency brake lever which is pivoted between its lower and upper arms 33, 34 on a suitable stationary part of the automobile, such as the main frame. The connection between the lower arm of this emergency hand lever and the front end of the pull rod 32 is so constructed that upon moving the upper arm of the emergency lever backwardly, this pull rod will be moved forwardly, so as to set the emergency brake mechanism, but if the corresponding brake mechanism should be set or operated by means other than this hand lever, as for instance by an air pressure motor, then this rod is capable of moving forwardly independently of this hand operated lever. To permit of such independent forward movement of the pull rod, various means may be provided, those shown in the drawings for this purpose being suitable and consisting of a U-shaped coupling yoke or clevis, the longitudinal arms or bars 35 of which have their front ends pivotally connected with the lower arm of the hand brake lever by means of a transverse pin 36 while the rear ends of the same are conneced by a cross bar 37, the central part of which is provided with an opening through which the front end of the pull rod 32 passes, this rod being provided at its front end with a head 38 adapted to engage the front side of this cross bar. On moving the hand lever 33, 34 in the direction for setting the emergency brake, the cross bar 37 of this coupling yoke will bear against the head 38 of this pull rod and move the latter forwardly for setting the emergency brake but if the corresponding brake is set by means other than this hand lever then the rod 32 will simply slide through this cross bar and its head will move forwardly away from the front side thereof.

My improved compressed air mechanism for actuating the inner and outer brake shoes or bands of the drums by means of air pressure which is associated with the foot and hand-operated mechanism previously described, may be variously constructed, but in the preferred form shown in the drawings, the same is organized as follows:

39 represents an abutment having preferably the form of a horizontal transverse bar which is connected at its opposite ends with the lower ends of the inner arms 19 of the two shaft sections of the foot brake mechanism. On its front side this abutment has pivoted thereto near one end thereof, a vertically-swinging latch 40 which is yieldingly held in a depressed position by means of a spring 41 connecting the free end of this latch with an adjacent stationary part of the automobile, such as the main frame, the downward movement of this latch being limited by a stop 42 on the abutment. This latch may be lifted into its inoperative position by means of motion which is derived from the foot brake lever 23, this being preferably accomplished by means of a pull line 43 which is connected at its rear end with the free end of the latch and at its front end to the cross bar 26 of the foot pedal yoke while the intermediate part of this line passes around a suitable guiding device, such for instance as a roller 44 mounted on a convenient part of the main frame or other stationary part of the automobile.

Arranged in rear of the latch and the abutment bar is an emergency or secondary operating arm 45 which is secured at its upper end to the central part of the emergency rock shaft. The intermediate part of this operating arm is provided with an opening 46 which in the depressed position of the latch is horizontally and lengthwise in line with the latter. Immediately in rear of the latch and arranged within the opening 46 of the operating arm is the front head of a horizontal plunger, pusher or piston rod 47 which passes through a stuffing box 48 in the front head of an air motor cylinder 49, in which latter is arranged a piston 50 which reciprocates lengthwise therein and is connected with the inner or rear end of the piston rod 47. When free, this piston is moved rearwardly by means of a spring 51 arranged within the front part of this cylinder around the inner end of the piston rod and bearing at its front end against the front head of the motor cylinder while its rear end bears against this piston, as best shown in Fig. 5. Between the front head of the motor cylinder and the emergency operating arm 45 the piston rod is provided with a shoulder 52 which is preferably formed by means of a cross pin thereon, this shoulder being adapted to bear against the rear side of the operating arm 45. The piston is moved forwardly for applying both the foot and emergency brake mechanisms by air pressure, this air being withdrawn from a storage reservoir or tank 53 and conducted to the rear end of the motor cylinder by means of a conduit or pipe 54. Communication between the storage tank and the motor cylinder is effected by means of a supply valve which may be of any suitable construction but which, as shown in Fig. 5, may consist of a valve casing 55 having its inlet and outlet connecting respectively with sections of the conduit 54 while the port therethrough is adapted to be opened and closed by a transversely movable stopper, plug or gate 56. The opening of this supply valve for permitting compressed air to pass from the storage tank to the motor cylinder is effected during the first part or step of the forward movement of the foot operated lever or pedal 23 for which purpose a connection is used between this lever and the plug or gate of the supply valve by means which in their preferred construction comprise a horizontally-swinging valve rock lever having a short arm 57 which is connected by means of a link 58 with the stem of the supply valve while its long arm 59 is connected by means of a pull line 60 with the cross bar 26 of the coupling yoke mounted on the foot lever 23. The intermediate part of this pull line passes around suitable guides consisting of pulleys 61 or the like mounted on adjacent stationary parts of the automobile, such as the main frame. Rearward movement of the pull line 60 and the closing of the supply valve is effected by means of a spring 62 connecting the long arm 59 of the supply valve operating lever with an adjacent stationary part of the automobile. When the supply valve is shut for the purpose of cutting off the admission of compressed air to the motor cylinder, the rear end of the latter may be vented to the atmosphere for the purpose of releasing the braking mechanism. This is accomplished in the present instance by means of a vent valve which places the interior of the motor cylinder in communication with the atmosphere. In the form of this valve shown in Fig. 5, the same comprises a casing 63 which has its chamber connected with the pipe or conduit leading from the supply valve to the motor cylinder and the same is also provided with a port 64 leading to the atmosphere, which port is opened and closed by a sliding plug, gate or stopper 65 movable transversely in the casing and operated by means of a link 66 connecting the stem of this stopper with the long arm 59 of the lever which operates the supply valve. By connecting the plugs or gates of the supply valve and the vent valve with opposite arms of this valve lever, a rocking movement of the latter in one direction will cause the supply valve to open and the vent valve to close, while a movement of this lever in the opposite direction will cause the supply valve to close and cut off communication between the air storage tank and the motor cylinder and instead connect the motor cylinder with the atmosphere.

For the purpose of holding the operating arm 45 of the emergency rock shaft and the operating arms 19 of the sections of foot brake shaft in their forwardly-turned or operative position, so that the brakes remain set after being applied, a detent device is provided which in its preferred construction consists of a catch 68 which projects lengthwise through an opening 69 in the lower part of the emergency brake operating arm while its front end is pivoted on an adjacent stationary part of the automobile, so as to permit this catch to swing vertically. A weight 70 is mounted on the rear part of this catch for the purpose of holding a rearwardly-facing shoulder 71 on the underside of this catch in engagement with the lower edge of the opening 69 of the emergency operating arm after the latter has been swung forwardly. Release of this catch from this operating arm is preferably effected from a point within convenient reach of the operator or driver, for which purpose the rear end of this catch is connected by means of a releasing line 72 with a pull button or handle 73 mounted on the dash or instrument board of the automobile, the intermediate part of this releasing line passing around guides or pulleys 74 mounted on convenient parts of the automobile frame. The return movement of the pull button is preferably effected by means of a spring 75 so as to furnish the requisite slack in the releasing line to enable the catch to drop promptly and properly engage the emergency operating arm.

Any suitable means may be provided for supplying compressed air to the tank 53 and storing the same in the latter preparatory to utilizing it for operating the auxiliary air actuated brake mechanism. The mechanism shown in the drawings for supplying compressed air to this tank has been found satisfactory in practice, and as there shown the same is constructed as follows:

76 represents an air compressor of any suitable construction which receives air from the external atmosphere and delivers the same by means of a pipe 77 into the storage tank. 78 is a driven sprocket wheel which is mounted on the crank shaft 79 of this air compressor and adapted to be connected with and disconnected therefrom by means of a clutch one jaw 80 of which is arranged on the hub of the driven sprocket wheel 78 while the other jaw 81 is splined on the shaft of the air compresser, so as to be capable of sliding lengthwise thereon but compelled to turn therewith. The driven sprocket wheel 78 is turned constantly when the automobile engine is in operation by means of a chain belt 83 passing around the driven sprocket wheel 78 and also around a driving sprocket wheel 84 mounted on the longitudinal shaft 85 forming part of the driving mechanism of the automobile. The longitudinally movable clutch jaw 81 is connected with an operating lever 86 so that it can be moved into and out of engagement with the clutch jaw 80 on the driven sprocket wheel by swinging this clutch lever. For this purpose, one end of the latter is pivoted on an available stationary part of the automobile frame while the free end of this clutch lever is connected by means of a shifting rod 87 with a piston 88 arranged in a shifting cylinder 89. One end of the latter is connected by means of a passage 90 with the interior of the air storage tank while the other end of the cylinder contains a spring 91 which operates to push the piston 88 backwardly or toward the passage 90. When the pressure of air in the storage tank is below normal, the spring 91 operates to push the shifting piston 88 toward the passage 90 which connects the same with the storage tank, thereby causing the clutch lever to be shifted from the position shown by dotted lines to the position shown by full lines in Fig. 6, whereby the driven sprocket wheel 78 is coupled with the crank shaft of the air compressor and the latter is caused to force air into the storage tank. When the pressure of air in the latter rises above normal, the piston 88 is forced away from the connecting passage 90, thereby causing the clutch lever 86 to be moved from its full line position to its dotted line position in Fig. 6, thereby uncoupling the jaws 80, 81 of the clutch and disconnecting the driven sprocket wheel from the shaft of the air compresser, whereby the operation of the air compresser is arrested and the further supply of compressed air to the storage tank ceases.

The operation of this improved brake mechanism, briefly described, is as follows:

In the relaxed position of the parts, the foot lever 23 is swung or moved into its rearward position, the upper arm 34 of the emergency hand lever is moved into its forward position, the operating arms 45, 19, 19 of the emergency brake rock shaft and the normal rock shaft sections are moved into their rearmost position, the latch 40 is in its lowered position, the catch 68 has its shoulder 71 unlocked from the lower edge portion of the emergency operating arm 45, and the front end of the piston rod 47 is arranged in its rearmost position, as best shown in Figs. 1, 2 and 5.

Upon now moving the foot brake lever forwardly, the first part or step of this movement will cause a rearward pull on the air valve line 60 which will operate to close the vent valve 63 and open the air supply valve 55, so that some of the compressed air from the storage tank will pass into the rear end of the motor cylinder 49 and push the piston rod 47 forwardly against the latch and shift the latter forwardly, whereby the rock shaft sections 15 of the normal or foot brake mechanism will be turned in the direction for applying the external brake shoes which surround the periphery of the brake drums on the driving wheels of the car and effect an ordinary, normal or moderate application of the brake mechanism. If a more powerful braking action is required, the forward movement of the foot lever 23 is continued another step after the ordinary braking effect has been obtained. During this second part or step of the forward movement of this foot lever, a forward pull is effected on the latch releasing line 43 which operates to raise the latch out of the path of the piston rod 47, so that now the piston rod can pass forwardly underneath the latch and the abutment bar 39 and engage its shoulder or pin 52 with the rear side of the emergency operating arm 45, whereby the latter is swung forwardly into engagement with the rear side of the latch and a continued forward movement of the piston rod thereafter causes both the ordinary operating arms 19, 19, and the emergency operating arm 45 to be pushed forwardly in unison, and thereby cause a simultaneous application of the normal or foot brake mechanism and the emergency or hand lever brake mechanism. When the piston rod 47 and the operating arms 45, 19, 19 have reached their foremost position and the brakes have been applied with a maximum degree of effectiveness, the lower end of the emergency rock arm 45 has passed in front of the locking shoulder 71 of the catch and has been engaged thereby, as shown in Fig. 3, whereby the brake mechanism remains set and the wheels are held against turning until the catch 68 has been released notwithstanding that the air pressure in the motor has been cut off and both the foot brake lever 23 and the hand brake lever 33, 34 have been released. A release of the braking mechanism is effected by a rearward pull on the button or handle 73 which lifts the catch 68, so as to disengage its shoulder 71 from the lower part of the emergency operating arm 45, thereby permitting the latter to be moved backwardly by the relaxation of the brake mechanism of which the same forms a part and at the same time the rock shaft sections 15, 15 and the parts associated therewith are moved backward into their relaxed position by means of the springs 67 connecting with opposite ends of the equalizing bar. Such backward movement of the operating arms 45 and 19, 19 is permitted on account of the air pressure having been previously cut off from the rear end of the operating or motor cylinder 49 and communication having been established between the latter and the atmosphere, and the piston rod 47 having been moved backwardly by means of the spring 51. If, for any reason, the air operated part of this brake mechanism should become inoperative, the last part of the forward movement of the foot lever 23 will effect an ordinary or normal application of the brake shoes on the outside of the brake drum in the usual manner, and a backward movement of the upper arm of the hand or emergency brake lever will also effect an engagement of the inner brake shoes with the inner side of the brake drums in the customary manner without interference with the air operated mechanism. It is thus possible to operate the brake mechanism either by foot power, by hand power, or by air pressure, or by a combination of these various powers in accordance with varying conditions. Whenever an application of the brakes is effected by the air operated mechanism, the pull rods 22, 32, which are ordinarily employed when operating the foot lever and the emergency lever, will slide idly through the rear cross bars of the yokes which couple these rods with their respective levers, thereby avoiding any interference between the air operated mechanism and the manually operated parts of the brake mechanism.

When an ordinary or an emergency application of the brakes is made by means of the foot lever 23 or the hand lever 33, 34, independently of the air operated means, a forward movement of the operating arm 45 will cause the brakes to be locked in said position until this operating arm is released by pulling backwardly on the button 73 and lifting the catch out of engagement from the emergency operating arm in the same manner in which this is accomplished for releasing the brakes after an air application of the same has been made.

It will now be clear that during the first part of the forward movement of the manually operated normal or service lever 23, or equivalent means, the brake shoes 11 will be actuated by air pressure and applied moderately and with sufficient effectiveness to control the movement of the automobile under ordinary conditions. During the next part of the forward movement of the manually operated normal lever the brake mechanism will be actuated by air pressure with greater power inasmuch as the normal and emergency brake shoes are now both applied and exert their combined effect to control the movement of the car as becomes necessary when a hazardous or highly dangerous situation arises. In the event that the air operated portion of the brake mechanism should for any reason fail to function or operate to set the brakes a continued forward movement of the lever 23 for effecting the last part thereof after completion of the first normal part and second emergency part of this movement, as heretofore described, will result in a safety or reserve application of the brake mechanism by the utilization of manual power only which is equally as good and as effective as the normal or service brake action of the mechanism now in common use. Obviously this brake mechanism therefore has all the capabilities of the standard brake mechanism now in general use with the added advantage of being able to operate the brakes by air pressure for making normal and emergency applications of the brake mechanism so long as the air operated portion of the same is in working condition. In addition to this an emergency application of the brakes may be effected manually at any time by operating the usual emergency lever 33, 34 independently of the air operated mechanism in case the latter should become inoperative.

This auxiliary air operated mechanism for actuating the brakes independently of the foot lever 23 and the hand lever 33, 34 not only increases the safety with which automobiles may be operated, but also enables this work to be done more conveniently and with less fatigue and permits of a much more powerful application of the brakes than would be possible by the use of manual power only. Furthermore, the catch mechanism which holds the brakes in their applied position is automatic in its operation and serves to hold the car against motion until released by a pull upon the button 73, thereby causing the brakes to be held tight upon pushing the foot lever forwardly independently of any operation of the hand lever 33, 34 for applying the emergency brakes.

This air operated attachment for the brake mechanism of automobiles is particularly advantageous in that it can be installed in automobiles of the type now in general use in which the brake mechanisms are of substantially uniform or standard design.

I claim as my invention:

1. A brake mechanism for automobiles comprising a shifting member for controlling a brake member adapted to engage a part operatively connected with a wheel of the automobile, a manually operated lever having a slip connection with said shifting member, which slip connection compels said shifting member to move in the operative direction with said lever when the latter is operated but permits said shifting member to move in the operative direction independently of said lever, an air operated motor adapted to actuate said shifting member independently of said lever and controlling means whereby said lever during the first part of its forward movement will cause said air motor to apply the brake member by power and during a subsequent part of the forward movement of said lever the latter causes a manual application of said brake member.

2. A brake mechanism for automobiles comprising a shifting member for controlling a brake member adapted to engage a part turning with a wheel of the automobile, a manually operated lever, a clevis pivotally connected with said lever and having its cross bar provided with an opening, a shifting rod pasing through said opening and provided in front of said bar with a head and having its rear end operatively connected with said shifting member, and an air operated motor adapted to actuate said brake shifting member independently of said lever.

3. A brake mechanism for automobiles comprising a shifting member for controlling a brake member adapted to engage a part turning with a wheel of the automobile, a manually operated lever having a slip connection with said shifting member which compels said shifting member to move forwardly with said lever when the latter is operated but permits said shifting member to move forward independently of said lever, an air operated motor adapted to actuate said brake shifting member independently of said lever, and means for controlling the operation of said motor by shifting said lever, said controlling means being so constructed that when said lever effects the first part of its forward movement it will cause said air motor to apply the brake member by power and during a subsequent part of the forward movement of said lever the latter causes a manual application of said brake member.

4. A brake mechanism for automobiles comprising a shifting member which is connected with a brake member adapted to engage a part operatively connected with a wheel of the automobile, an abutment arranged on said shifting member, a manually operated lever connected with said shifting member, an air operated motor having a cylinder, a piston in the cylinder and a piston rod connected with the piston and adapted to press said abutment, and means for controlling the operation of said motor by motion derived from said lever, said controlling means being so constructed that when said lever effects the first part of its forward movement it will cause said air motor to apply the brake member by power and during a subsequent part of the forward movement of said lever the latter causes a manual application of said brake member.

5. A brake mechanism for automobiles comprising a rock shaft which is connected with a brake member adapted to engage a part turning with a wheel of the automobile, a rock arm arranged on said shaft and having an abutment, a manually operated lever connected with said rock shaft, an air operated motor having a cylinder, a piston in the cylinder and a piston rod connected with the piston and adapted to press said abutment, a compressed air storage tank, a conduit connecting said tank with said motor cylinder and having a supply valve and a vent valve, air controlling means for connecting said cylinder with said tank or with the atmosphere, and means operatively connecting said lower and air controlling means for connecting said cylinder with the tank during the operative movement of said lever and connecting said cylinder with the atmosphere during the return movement of said lever.

6. A brake mechanism for automobiles comprising a movable actuating member which is connected with a brake member adapted to engage a part operatively connected with a wheel of the automobile, an abutment arranged on said shaft movable member, a manually operated lever connected with said movable member, an air operated motor having a cylinder, a piston in the cylinder and a piston rod connected with the piston and adapted to press said abutment, means for causing said motor to operate said actuating member for applying the brake upon moving said lever in its operative direction, and a detent device for holding said brake member in its applied position.

7. A brake mechanism for automobiles comprising a rock shaft which is connected with a brake member adapted to engage a part operatively connected with a wheel of the automobile, a rock arm arranged on said shaft and having an abutment, a manually operated lever connected with said rock shaft, an air operated motor having a cylinder, a piston in the cylinder and a piston rod connected with the piston and adapted to press said abutment, means for causing said motor to operate said shaft for applying the brake upon moving said lever forwardly, a detent device for holding said brake in an applied position, and manually operated means for releasing said detent device.

8. A brake mechanism for automobiles comprising a shifting member adapted to move a brake member into engagement with a part operatively connected with a wheel of the automobile, manually operated means for actuating said shifting member, motor operated means for actuating said shifting member, and a detent device for holding the brake mechanism in an applied position.

9. An air brake mechanism comprising normal means for effecting a normal braking action, emergency means for effecting an emergency braking action, manually operated means which serve to apply said normal braking means, and automatic means associated with said manually operated means and serving to apply said emergency braking means after the normal braking means have been set in operation.

10. A brake mechanism for automobiles comprising foot operated means for arresting the movement of a part operatively connected with a wheel of the automobile, hand operated means for arresting the movement of a part operatively connected with a wheel of the automobile, and power operated means for actuating said foot operated means by itself, or simultaneously actuating said foot operated means and said hand operated means.

11. A brake mechanism for automobiles comprising foot operated means for arresting the movement of a part operatively connected with a wheel of the automobile which means include a primary rock arm, hand operated means for arresting the movement of a part operatively connected with a wheel of the automobile which means include a secondary rock arm arranged adjacent to said first mentioned rock arm, and an air operated motor adapted to turn both of said arms and apply the foot and hand operated means of the brake mechanism.

12. A brake mechanism for automobiles comprising foot operated means for arresting the movement of a part operatively connected with a wheel of the automobile which means include a primary rock arm, hand operated means for arresting the movement of a part operatively with a wheel of the automobile which means include a secondary rock arm arranged adjacent to said primary rock arm, an air operated motor adapted to turn both of said arms and apply the foot and hand operated means of the brake mechanism, and a detent device for holding said arms in the positions in which the brake mechanism is applied.

13. A brake mechanism for automobiles comprising foot operated means for arresting the movement of a part operatively connected with a wheel of the automobile which means include a rock shaft having a primary rock arm, hand operated means for arresting the movement of a part operatively with a wheel of the automobile which means include a rock shaft having a secondary rock arm arranged adjacent to said primary rock arm, an air operated motor adapted to turn both of said arms and apply the foot and hand operated means of the brake mechanism, a detent device for holding said arms in the position in which the brake mechanism is applied, and means for releasing said detent device.

14. A brake mechanism for automobiles comprising a normal rock arm operatively connected with the normal brake shoes of the brake mechanism, an emergency rock arm operatively connected with the emergency shoes of the brake mechanism, an abutment mounted on said normal rock arm, a latch movably mounted on said abutment, a piston rod adapted to engage either with said latch or to pass the same and said abutment and provided with a shoulder adapted to engage with said emergency rock arm, an air motor cylinder, and a piston arranged in said cylinder and connected with said piston rod.

15. A brake mechanism for automobiles comprising a normal rock arm operatively connected with the normal brake shoes of the brake mechanism, an emergency rock arm operatively connected with the emergency shoes of the brake mechanism, an abutment mounted on said normal rock arm, a latch movably mounted on said abutment, a piston rod adapted to engage either with said latch or to pass the same and said abutment and provided with a shoulder adapted to engage with said emergency rock arm, an air motor cylinder, a piston arranged in said cylinder and connected with said piston rod, and a manually operated lever connected with said latch and adapted when moved in an operative direction to lift said latch out of the path of said piston rod.

16. A brake mechanism for automobiles comprising a normal rock arm operatively connected with the normal brake shoes of the brake mechanism, an emergency rock arm operatively connected with the emergency shoes of the brake mechanism, a latch movably mounted on said abutment, a piston rod adapted to engage either with said latch or to pass the same and said abutment and provided with a shoulder adapted to engage with said emergency rock arm, an air motor cylinder, a piston arranged in said cylinder and connected with said piston rod, a manually operated lever connected with said latch and adapted when moved forward to move said latch out of the path of said piston rod, and a spring for moving said latch into the path of said piston rod.

17. A brake mechanism for automobiles comprising a normal rock arm operatively connected with the normal brake shoes of the brake mechanism, an emergency rock arm operatively connected with the emergency shoes of the brake mechanism, an abutment mounted on said normal rock arm, a latch movably mounted on said abutment, a piston rod adapted to engage either with said latch or to pass the same and said abutment and provided with a shoulder adapted to engage with said emergency rock arm, an air motor cylinder, a piston arranged in said cylinder and connected with said piston rod, and a catch for holding said normal and emergency rock arms in their operative positions.

18. A brake mechanism for automobiles comprising a normal rock arm operatively connected with the normal brake shoes of the brake mechanism, an emergency rock arm operatively connected with the emergency shoes of the brake mechanism, an abutment mounted on the normal rock arm, a latch movably mounted on said abutment, a piston rod adapted to engage either with said latch or to pass the same and said abutment and provided with a shoulder adapted to engage with said emergency rock arm, an air motor cylinder, a piston arranged in said cylinder and connected with said piston rod, a catch for holding said normal and emergency rock arms in their operative positions, and means for releasing said catch extending from a place adjacent to the dash board.

19. A brake mechanism for automobiles comprising a normal rock shaft operatively connected with the normal brake shoes of the brake mechanism, an emergency rock shaft arranged in rear of the normal rock shaft and operatively connected with the emergency shoes of the brake mechanism, a normal operating rock arm depending from said normal rock shaft and provided with an abutment, a vertically movable latch mounted on said abutment, an emergency operating rock arm depending from the emergency rock shaft, a piston rod adapted to have its front end engage either with the rear side of said latch or to pass underneath the same and said abutment and provided with a shoulder adapted to engage with said emergency rock arm, an air motor cylinder, a piston arranged in said cylinder and connected with said piston rod, a catch for holding said normal and emergency rock arms in their forward position, and means for releasing said catch comprising a pull button arranged adjacent to the dash board and a pull line connecting said button with said catch.

20. A brake mechanism for automobiles comprising a normal rock shaft having two sections, outer rock arms depending from the outer ends of said shaft sections and operatively connected with the two normal brake shoes of the brake mechanism, inner operating arms arranged at the inner ends of said shaft sections, an equalizing bar connected at its opposite ends with said inner rock arms, a foot lever connected with said equalizing bar, an abutment bar connected with said inner rock arms, a vertically swinging latch pivoted on said abutment bar and connected with said foot lever, an emergency rock shaft arranged in rear of said normal rock shaft sections and having its outer ends operatively connected with the emergency brake shoes of the brake mechanism, an emergency hand lever operatively connected with said emergency rock shaft, an emergency rock arm arranged on said emergency rock shaft, a piston rod adapted to engage said latch or pass the same and provided with a shoulder adapted to engage said emergency operating arm, an air motor cylinder, a piston in said cylinder connected with said piston rod, a compressed air storage tank, and a valve mechanism operatively connected with said foot lever and adapted in one position to connect said tank with said cylinder and in another position to disconnect said tank from said cylinder and connect the latter with the atmosphere.

21. An air brake mechanism comprising normal means for effecting a normal braking action, emergency means for effecting an emergency braking action, manually operated means which serve to apply said normal braking means, automatic means associated with said manually operated means and serving to apply said emergency braking means after the normal braking means have been set in operation, and means for supplying air pressure for effecting application of said normal and emergency braking means.

22. An air brake mechanism comprising normal means for effecting a normal braking action, emergency means for effecting an emergency braking action, manually operated means which serve to apply said normal braking means, automatic means associated with said manually operated means and serving to apply said emergency braking means after the normal braking means have been set in operation, and means for supplying air pressure for effecting application of said normal and emergency braking means, comprising a compressed air storage tank, a compressor for delivering air to said tank, a driving member, and means for operatively connecting said compressor with said driving member when the pressure of the air in said tank drops below normal and operatively disconnects said compressor from said driving member when the pressure in said tank rises above normal.

23. A brake mechanism comprising brake elements, air power shifting means, and manually actuated controlling means associated with said parts and operating when traversing the first part of its forward movement to cause said air power means to apply said brake elements with a moderate or normal effect, and while traversing the second part of its forward movement to cause said air power means to apply said brake elements with a more powerful or emergency effect, and while traversing the last part of its forward movement to cause a manual application of said brake elements independently of said air power means.

24. A brake mechanism comprising normal brake elements, emergency brake elements, air power shifting means, manual shifting means, and manual controlling means, said parts being constructed and arranged that during the first part of the forward movement of said controlling means said air power means will operate only on said normal brake elements for applying the braking effect of the same, during the second part of said forward movement of the controlling means said emergency brake elements will be coupled with said normal brake elements and produce an increased or emergency braking effect, and during the last part of the forward movement of said controlling means the same will operate by manual power on one of said brake elements and permit of producing a braking effect independently of said air power means.

JOHN H. RICHARD.